United States Patent [19]

Asai et al.

[11] 4,373,128
[45] Feb. 8, 1983

[54] METHOD OF ELECTROSLAG SURFACING OF COMPONENTS HAVING A CYLINDRICAL SURFACE

[75] Inventors: Yoshihiko Asai; Masao Hori, both of Kitakyushu; Naoki Tokumitsu, Kawasaki, all of Japan

[73] Assignee: Nippon Steel Corporation, Tokyo, Japan

[21] Appl. No.: 220,725

[22] Filed: Dec. 29, 1980

[30] Foreign Application Priority Data

Dec. 29, 1979 [JP] Japan ................................. 54-172596
Aug. 12, 1980 [JP] Japan ................................. 55-109873

[51] Int. Cl.³ .......................... B23K 9/04; B23K 25/00
[52] U.S. Cl. .................................. 219/73.11; 219/73.1
[58] Field of Search ............................ 219/73.1, 73.11

[56] References Cited

U.S. PATENT DOCUMENTS 4,228,336 10/1980 Okuni ................................. 219/73.11
4,303,822 12/1981 Hirsch ................................. 219/73.1

FOREIGN PATENT DOCUMENTS 2728530 1/1979 Fed. Rep. of Germany ..... 219/73.1
47-21348 2/1971 Japan ................................. 219/73.11

Primary Examiner—Elliot A. Goldberg
Attorney, Agent, or Firm—Wenderoth, Lind & Ponack

[57] ABSTRACT

The invention relates to an electroslag surfacing of cylindrical components, such as a rolling-mill roll for iron production. The invention seeks to solve the problems of the electrodes for supplying a high current to the slag, and; how to prevent excess fusion-penetration of the base metal from occurring during the thick surfacing which results in an increase in heat input and a decrease in welding speed or the speed of rising the metal pool. In the present invention, a multi-phase alternating current is supplied to the slag via a plurality of consumable electrodes each in the form of a bar having a large cross section, and further the surfacing is conducted while rotating the workpiece and continuously adding molten metal to the surface of the slag bath. The invention can be mainly utilized for the production and repairing of cylindrical composite components.

11 Claims, 15 Drawing Figures

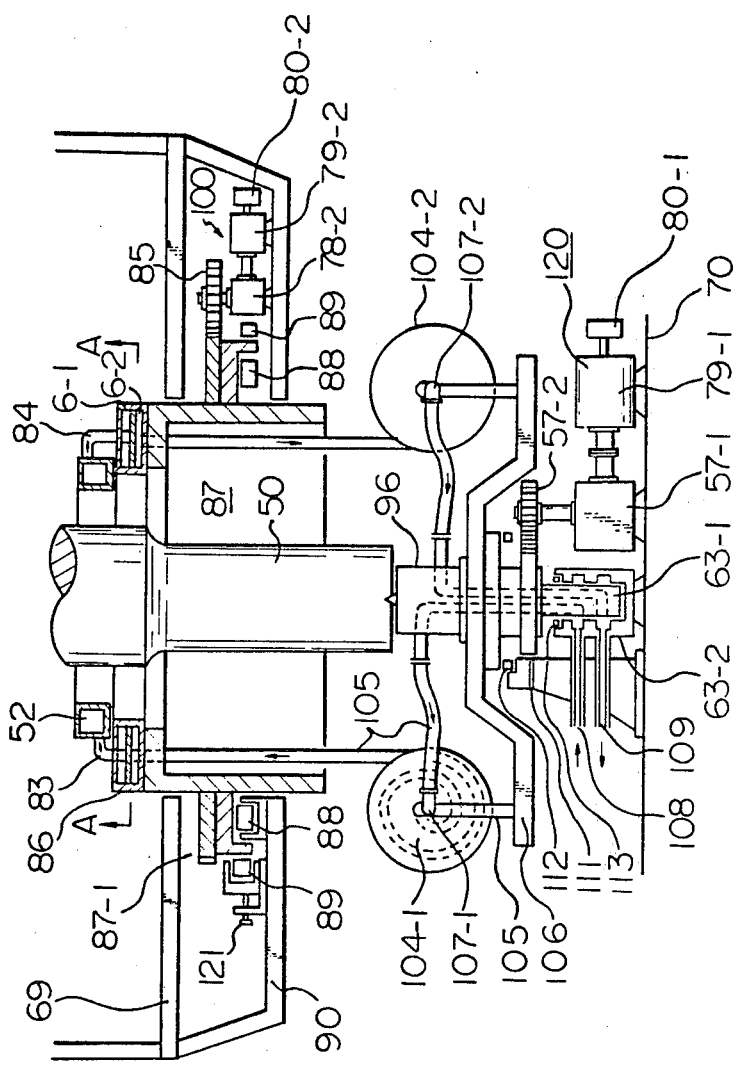

METHOD OF ELECTROSLAG SURFACING OF COMPONENTS HAVING A CYLINDRICAL SURFACE

The present invention relates to a method of electroslag surfacing of components having a cylindrical surface, such as a columnar component or a cylindrical component, for example rolls and sleeves, capable of surfacing large diameter components or depositing a thick layer of surfacing metal. The present invention also relates to an electroslag surfacing apparatus for components having a cylindrical surface.

Electroslag welding, of which electroslag surfacing is one aspect, is based on the same melting principle as the electroslag remelting which is known as a method for obtaining high quality-metals. Namely, in electroslag welding, a consumable electrode is immersed in a molten slag layer which shields the metal pool thereunder from ambient air, a high current is supplied via the consumable electrode to the molten slag layer, the consumable electrode and the surface of the base metal are fused due to the Joule's heat of the slag, and a metal deposition on the base metal is achieved while an ingot is formed vertically-up in accordance with the electrode consumption. Therefore, in electroslag welding, $O_2$ and $N_2$ of the ambient air can penetrate into the solidifying metal to only a limited extent and metallurgical reactions due to the molten slag can be expected. A high quality solidified metal can thus be obtained. The metal deposition on the base metal is highly reliable, because complete fusion of the base metal is assured. Electroslag welding has therefore been utilized for welding thick plates and components.

A noticeable tendency in the increased capacity of modern industrial plants is a worsening resulting from operating conditions in the industrial plants, and an increase in the scale, thickening and the enhancement of alloy contents of the components of apparatus used in these plants. Electroslag surfacing has more and more attracted attention as a means for reforming and producing the components of apparatus used in modern plants.

Among the components of apparatus in the modern plants, the rolling-mill roll for iron and steel manufacture is a component which it is highly desired to provide with a composite structure or to be reformed for energy economy and better use of natural resources.

"Electroslag Welding" (2nd edition) edited by B. E. Paton, translated and published by American Welding Society, Inc. (pp. 148–151) recites a new producing or reforming method for a roll by electroslag surfacing and teaches that the rotation of a roll is advantageous for obtaining a uniform-quality deposit.

Japanese Published Patent Application No. 9095/1969 proposes an electroslag surfacing method for a roll, in which the workpiece and a mold are simultaneously rotated and only the mold is downwardly displaced during rotation.

Japanese Published Utility Model Application No. 15238/1970 proposes a mold structure for electroslag surfacing, in which the mold is partitioned into a rotatable part, a non rotatable part and a seal between these two parts.

When the known electroslag surfacing methods described above are used for producing a composite roll, or reforming of a roll having a diameter of for example, from 700 to 1200 mm and a deposit thickness of, for example, from 50 to 100 mm, the number or length of electrodes must be so increased that excessive fusion penetration of the base metal makes these methods impractical.

In the prior methods described in the published patent and utility model applications mentioned above, a sealing contrivance for the cooling water to be supplied into a mold is not sufficient for preventing water leakage, and the mold, which is elaborate, results in increased installation costs.

Due to the principle of electroslag welding explained above, the cooling speed of the deposited metal after welding is so slow that no weld metal cracking due to hardening occurs. In this regard electroslag welding is appropriate for depositing a high carbon- high alloyed-steel on a liner or a roll by surfacing. However, the fact that deposited and solidified metal is gradually and continuously formed vertically causes the problem explained in reference to FIG. 1 to occur in the case where the compositions of the base metal and surfacing metal for composite components are different from each other.

Referring to FIG. 1, a copper strap 2 is disposed so that the required welding gap (surfacing radius) is defined between the copper strap 2 and a workpiece 1. A consumable electrode 4 having a predetermined composition is uninterruptedly supplied into the slag bath 3 during the surfacing operation. Since the carbon and alloy contents of the workpiece 1 are lower than those of the consumable electrodes 4, the melting point of the base metal of the workpiece is usually high. When the fused metal 7 drops from the workpiece 1 into the metal pool 6 for surfacing, the fused metal 7 immediately solidifies or, even if it does not solidify immediately, the viscosity of the fused metal 7 becomes so low that the fused metal 7 cannot satisfactorily diffuse into the metal pool. When such satisfactory diffusion of the molten metal 7 does not take place, the metal solidifies in the form as denoted by 8 and causes the heterogeneous structure 9-1. Since an appreciable diffusion takes place even under the nonsatisfactory diffusion condition, segregation occurs so that the carbon-and alloy component-contents of the deposited metal are lower at portions nearer to the workpiece. The fused metal 7 drops from the workpiece intermittently, and, therefore, the heterogeneous structure 9-1 is formed in layers 9-2 which may extend to the surface of the faced workpiece. In the rolling operation with rolls having such a heterogeneous structure, the surface roughening of the rolls is accelerated and, the surface property of the roll is impaired. In addition, hot cracks due to the heterogeneous structure may be caused when the roll is employed for hot rolling.

It is an object of the present invention to solve the problems encountered in the vertical and circumferential surfacing of a large diameter component having a diameter preferably of about 700 mm or more with a thick deposit layer, preferably about 50 mm or more thick, the problems being: (1) what electrode should be used for supplying a high current to the slag, and; (2) how to prevent excess fusion-penetration of the base metal from occuring during the thick surfacing which results from an increase in heat input and a decrease in welding speed or the speed of the rise of the metal pool.

It is another object of the present invention to provide an electroslag vertical welding method for producing or reforming a high quality composite roll by surfacing the roll body with a material different from that of the roll body.

It is a further object of the present invention to provide an electroslag surfacing apparatus for carrying out the method of the invention on a component having a cylindrical surface, capable of processing a large diameter component and depositing a thick layer of a high quality metal.

The electroslag vertical surfacing method for a component having a cylindrical surface according to the present invention, is characterized in that a multi-phase alternating current is supplied to slag via a plurality of consumable electrodes in the form of a bar having a large cross section, and further the surfacing is conducted while rotating the workpiece and continuously adding molten metal to the level of the slag bath.

The characteristics of the method of the invention are described hereafter.

First, consumable electrodes are used because of the high current supplied via electrodes to the slag. Nothing but the material of the consumable electrodes can resist the high current conduction through the electrodes. If carbon, which is a typical material for nonconsumable electrodes, is used for the electrodes, suboxides, such as $SiO_2$ and $MnO$, in the slag are caused to react with the carbon and the CO gas formed by the reaction covers the slag level in the form of bubbles. The weldability is impaired, and also the control of the fusion penetration becomes complicated, because the distance between the electrodes and the workpiece varies due to the consumption of the tips of the electrodes and the resulting change in the electrode shape, which consumption is caused by the reaction in the slag mentioned above and the oxidation of the electrodes by the atmosphere. If a high melting point metal, such as tungsten or molybdenum, is used instead of carbon for the nonconsumable electrodes, the consumption due to oxidation is even more serious, so that they cannot withstand the high electric current. Generally speaking, an alloyed steel or iron with a carbon content of 1% or more is used for surfacing a component such as the work rolls of a rolling mill, which is an object of the present invention and, this surfacing component is required to have resistance against wear and hot cracking. In the case of depositing the alloyed steel or iron with a carbon content of 1% or more and thus a high melting point by electroslag surfacing, $SiO_2$, $MnO$ and the like are usually added to a high melting point flux normally used for depositing a low carbon steel so as to reduce the melting point of the flux. Therefore the reaction between the nonconsumable electrodes and $SiO_2$, $MnO$ and the like is accelerated when depositing a high carbon steel as compared with depositing a low carbon steel. The electrodes used in the present invention are therefore consumable, and the present invention makes it possible to prevent bubble generation in the slag and a stable welding procedure can be ensured while constantly maintaining the identical shape of the electrodes.

Second, consumable electrodes in the form of a bar are used because of the necessity of supplying a high current ranging from 10,000 to 100,000 amperes to the slag bath. If wire electrodes, which are usually used in electroslag welding, are used for supplying such a high current, twenty or more electrodes are necessary, which makes the installation, operation and maintenance of the electroslag surfacing apparatus complicated and impractical. Not only is the use of wire electrodes impractical, but also the surfacing operation exhibits a most serious disadvantage in the case where alloyed steel or iron with a carbon content of 1% or more, which is a preferred facing material used in the method of the present invention, is used for the electrodes. Namely, it is difficult to shape the steel or iron described above into coils due to its hardness or work hardening. In the case where the alloy components of the steel or iron are nickel or molybdenum necessary for hard facing, it is impossible to shape the steel or iron into coils. The present inventors considered the electrodes in using form of a hoop coil. The required number of the electrodes in the form of hoop coils would still relatively high, and the working of hoops into a coil form is quite complicated. The present inventors considered a flux cored wire electrode, for example an electrode composed of a soft steel sheath and a filling consisting of a mixture of a power containing a high amount of carbon and an alloy component powder, the whole electrode composition being adjusted so that it corresponds to an alloyed steel or iron with a carbon content of 1% or more. When such an electrode is fused by electroslag melting, a high melting point ingredient of the electrode is transferred under a non fused state into the deposited metal, because the high carbon sheath and highly alloyed filling have low and high melting points, respectively. Even if the high melting point ingredient is fused, it solidifies without diffusion in the metal pool having a lower temperature than the slag and positioned below the slag, with the result that a nonuniform structure or segregation is caused. A flux cored wire electrode cannot therefore be used because of deterioration of the quality of the surfacing. In order to avoid the problems involved in the coiled wire-, coiled hoop- and flux cored wire-electrodes, alloyed steel or iron having the requisite composition must be cast or rolled into electrodes in the form of a long bar. In this regard, if the bar electrodes have a small cross sectional area, such as steel bars of a small diameter, the number of the electrodes is high as in the case of wire or hoop electrodes. In addition, in order to establish a uniform temperature distribution in the slag by the small cross section electrodes, it is necessary not only to arrange the electrodes circumferentially but also to arrange a considerable number of the electrodes at a number of positions near the workpiece and the mold as well as at the center between the workpiece and the mold. The troublesome arrangement of numerous electrodes as explained above makes it impossible to perform the electroslag surfacing from the standpoint of both installation and operation. The bar electrodes must therefore have a large cross section.

Third, in the present invention, in addition to the use of a plurality of consumable electrodes in the form of a large cross section bar, the workpiece is rotated for the following reasons. The current supply per electrode is increased and thus the number of electrodes can be considerably reduced due to the workpiece rotation. The number of the electrodes can be approximately ten or less. If the workpiece is rotated during the operation, current can be satisfactorily supplied to the slag bath adjacent to the mold and the workpiece, thus complete fusion of the base metal and depositing metal as well as a good cast skin of the deposited metal at the mold side of the bath can be assured. One of the objects of the workpiece rotation is to obtain a uniform circumferential temperature-distribution of slag even with a smaller number of electrodes. This circumferentially uniform temperature is achieved by a circumferential rotation of slag created by the workpiece rotation, while the radially uniform temperature is achieved by the large cross section bar electrodes.

Fourth, the way in which excessive fusion penetration of the base metal is prevented by the present invention will be explained. In the case where the electrodes in the form of a large cross section bar are used, the base metal may undergo a deep fusion penetration in an amount of from 50 to 100 mm. Compared with conventional electroslag welding of thick plates, the welding speed is low, and the temperature increase of the workpiece is high in the conventional electroslag surfacing because: the diameter (strictly speaking radius) of the workpiece to be faced, which is equivalent to the plate width to be electroslag welded, has of a finite dimension and small; heat is concentrated from the circumference to the interior of the workpiece, and; heat radiation from the workpiece is small. The fusion penetration of the base metal therefore is quite deep, so that, even by the use of the large cross section bar electrodes, the distance between the electrodes and the fused surface of the workpiece is caused to be greatly increased. This in turn leads to a temperature drop of the slag near the fused surface of the workpiece, and the variation of the fusion penetration due to even a small variation of welding conditions, such as current, voltage, etc. The control of the fusion penetration therefore becomes difficult, and the fusion penetration becomes so non-uniform that a straight weld line cannot be obtained. This causes destruction of surfaced components such as rolls operated under a load at the bonding faces because of stress concentration due to residual stress or structural non uniformity.

Production of composite components by electroslag surfacing encounters a still more serious problem of segregation which is caused by the fact that the base metal having a composition different from the facing metal is fused in different quantities during the surfacing operation.

Furthermore a serious problem resides in the fact that, with deeper fusion penetration, such defects as pinholes and entrapment of slag at the fused zone are more liable to occur for the reasons explained above in connection with the problem of deep fusion penetration, and thus the quality may deteriorate. In order to prevent the problems involved in excessive fusion penetration from occurring, the temperature of slag must be increased and the depth of fusion penetration must be decreased as compared with conventional electroslag surfacing. This is accomplished by an important characteristic of the present invention, that is, the temperature of slag near the workpiece is increased by the large cross section electrodes described above, and heat absorption per weld line of the workpiece is kept small by the addition of molten metal into the metal pool while the slag temperature is kept high. The fusion penetration is 30 mm at the highest and is ideally 15 mm or less. Because of such shallow fusion penetration, the temperature of the slag near the fusion zone of the workpiece can be maintained high enough (the temperature distribution in the slag is enhanced) for eliminating the problems described above. Since the workpiece is rotated as described above, the molten metal, which is added to the metal pool at one location in the pool, and its heat are uniformly distributed circumferentially. The addition of a large quantity of molten metal leads to excessive speed of the rise of the level of the metal in the disadvantageous bath or the welding speed, with the result that the structure of the solidified deposited metal in the central zone is coarsened and, further minute pinholes or cavities are formed in the deposited layer. The addition of molten metal contributes greatly to a reduction in scale of the whole surfacing apparatus and provides a compact surfacing apparatus.

If the molten metal is not added while using the consumable electrodes in the form of a bar, the length of the electrodes consumed is determined by the ratio of the cross sectional area of the electrodes to the cross sectional area of the surfacing, so that the larger the cross sectional area of the electrodes, the shorter may be the length of the electrodes. Since the cross sectional area of the electrodes can be increased at the maximum 30% relative to the cross sectional area of the surfacing, the necessary length of the electrodes is at least three times the length of the surfacing. Therefore, electrodes at least 6 m long are necessary for a surfacing length of, for example, 2 m. Surfacing using such long electrodes becomes difficult to perform both from the standpoint of operation and installation, even if a supplemental columnar electrode section is connected to a columnar electrode section during the surfacing operation.

Since molten metal is added to the metal pool in the present invention, the electrode length can be almost the same as the surfacing length, with the result that the height of the entire surfacing installation is small, and further the surfacing operation is not complicated as compared with surfacing without the molten metal addition.

The rate of continuously adding molten metal exerts an delicate influence on the fusion penetration of the workpiece. Therefore, the addition rate should be fixed at a predetermined rate established by the desired depth of the fusion penetration, and, if the necessity for controlling the fusion penetration arises in the surfacing operation the current and voltage should be adjusted to control the fusion penetration rather than adjusting the molten metal addition rate. The molten metal should therefore be continuously added at a constant rate, and interruption of the molten metal addition is allowed only for a period of less than 1 minute. If the interruption lasts 1 minute or longer, not only is the depth of fusion penetration varied, but such metallurgical defects as deterioration of the cast skin and non-uniformity the metal structure are caused.

Fifth, the way in which the present invention has solved the problem of supplying a high current while rotating the workpiece will be described. In this connection, a large scale-collector installation to collect from the rotating workpiece a current ranging from 10,000 to 100,000 amperes, would be impractical. One of the characteristics of the present invention resides in the use as the electric power for the surfacing a multiphase alternating electric power source in a star connection and in which the electric power of each phase is fed to each electrode, and the workpiece is connected to the neutral point. The current transmitted back from the workpiece to the electric power source can be kept to the level of 2~3% (from 100 to 1,000 amperes), at the maximum, of the total current according the present invention, and thus the current collection from the workpiece is very easy not withstanding the workpiece rotation. The term "multi-phase alternating current" typically refers to a three-phase alternating current which is widely used in industry. In the three-phase alternating current, each phase differs from the other phases by 120° and the resultant current and voltage are zero at any time. The phase differences in two phase- and four phase-alternating currents are 180° and 90°, respectively. The multi-phase alternating current is connected in a star connection and the workpiece is connected to the neutral point because the electric current of each phase is equivalent to a single-phase current and is not dependent on the other phases in this connection. Namely, the voltage and current of one phase can be adjusted independently from the other phases, and the unbalanced current in each phase can be transmitted through a feed back loop via the workpiece to the neutral point of the electric power source according to the present invention. The unbalanced current at the neutral point is 1,000 amperes at the highest. The multi-phase alternating current source can advantageously stabilize the surfacing operation while using a high current, because the impedance drop, reduction in the power factor and the heating of the installation due to leakage of magnetic flux can be prevented.

An electroslag surfacing apparatus for carrying out the method according to the present invention comprises:

a multi-phase alternating current power source having a star connection output and a constant voltage characteristic, a workpiece being electrically connected to the neutral point of the star connection;

a slip ring for connecting the workpiece, which rotates, to the neutral point of the star connection;

a mold for defining a surfacing space, disposed in proximity to the workpiece movably upwardly with the progress of the surfacing operation;

a plurality of consumable electrodes each in the form of a large cross section bar;

an electrode-displacing means for lifting and lowering all the consumable electrodes in unison;

a tundish for adding a molten metal, disposed above the surfacing space movably upwardly with the progress of the surfacing operation, and;

a synchronous rotating means for rotating the tundish, the workpiece and the mold around the axis of the workpiece during upward movement of the tundish and the mold.

The present invention is hereinafter explained with reference to FIGS. 2 through FIG. 15 of the drawings, in which FIG. 1 illustrates an electroslag surfacing method.

FIG. 15 is an enlarged view of the lower part of the apparatus of FIG. 14.

Figure 1:
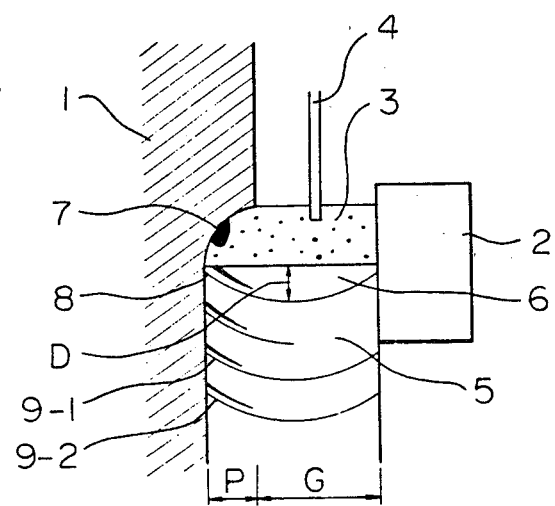
Figure 2:
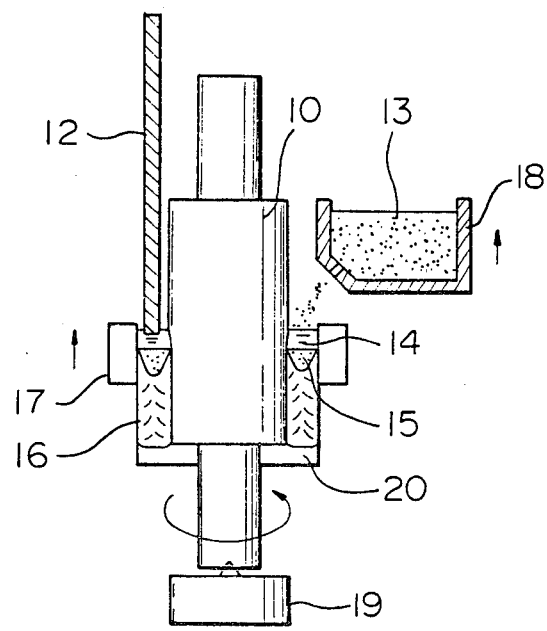
FIG. 2 is a schematic, partially cross sectional view of an electroslag surfacing apparatus for carrying out the method of the present invention.
Figure 3:
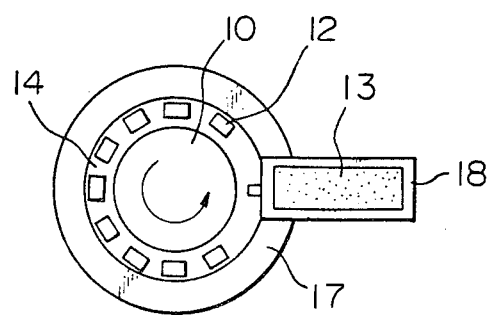
FIG. 3 is a top plan view of the apparatus shown in FIG. 2.

Referring to FIGS. 2 and 3 an electroslag surfacing apparatus for producing a composite roll according to the present method is schematically illustrated, which composite roll is produced by circumferential surfacing of the cylindrical part of a small diameter roll workpiece. The roll workpiece 10 is vertically mounted on the center of the turntable 19. A water-cooled copper mold 17 is positioned around the workpiece 10, so that a gap having the surfacing radius G is defined around the outer circumference of the roll workpiece by the inner radius surface of the mold and the outer surface of the roll workpiece. Before the start of electroslag welding, consumable bar electrodes 12 are suspended a manner that they circumferentially along the roll workpiece 10 and positioned centrally of the gap between the roll workpiece 10 and the mold 17. Fused slag 14 is charged into the space formed by a starting tub 20, the mold 17 and the roll workpiece 10, and thus electroslag welding is initiated.

The consumable bar electrodes 12 have a large cross section and may have a rectangular or round cross sectional shape. The radial distances of the consumable bar electrodes 12 from the surface of roll workpiece 10 and the inner surface of the mold 17 should be less than 30 mm, and electrodes should be spaced at these distances around the mold 17 for a circumferential length of at least 10% of the circumferential length of the mold 17.

The distance requirement above will be explained by an example, wherein the diameter of the roll workpiece 10 is 700 mm and the surfacing radius G (the distance between the mold and the roll workpiece) is 100 mm. In this example, the mold 17 has an inner diameter of 1,000 mm. The consumable bar electrodes 12 having a rectangular cross section are positioned at the center of the gap between the mold and roll workpiece and should have a thickness of at least 40 mm, i.e. the surfacing radius—$2 \times 30$ mm. Further, the consumable bar electrodes 12 should have a total width, i.e. circumferential dimension, which is at least about 300 mm, i.e. 10% of the circumference length of the mold 17. If the number of the consumable bar electrodes 12 is six, the width of every electrode must be 50 mm or more.

When the cross section of the consumable bar electrodes 12 is round, relatively large number of electrodes are necessary to satisfy the condition that the requisite geometry and position of the electrodes be such as to have a surface along the surfacing space at least 10% of the length of circumference. The rectangular or square cross sectional electrodes are therefore preferred to the round cross sectional electrodes. Further preferred electrodes are electrodes having a rectangular curved cross section with curved long sides and a radius corresponding to the radius of the surfacing space (surfacing radius).

When the consumable bar electrodes 12 with a cross sectional dimension in 50 mm × 80 mm are used for the surfacing of the example described above, a current ranging from 2,000 to 5,000amperes can be conducted through every one of the consumable bar electrodes 12, and therefore the requisite high current can be fed through about ten electrodes at the maximum, which is advantageous for simplifying the surfacing operation.

As clearly illustrated in FIG. 3, a plurality of the consumable bar electrodes 12 are used in the present invention. Because of using a plurality of electrodes are used, a multi-phase alternating current power source can be used, the heat source is distributed around the circumference of the surfacing space, and molten metal can be added through a space between electrodes onto the slag bath. The heat distribution and the workpiece rotation shown by the arrow in FIG. 3 provides a uniform temperature distribution of slag around the circumference of the bath of fused slag 14.

As the welding starts, the roll workpiece 10 is rotated. When the temperature of the base metal is elevated so that the surface of the roll workpiece 10 starts to fuse, molten metal having the same composition as the consumable bar electrodes 12 is continuously added to the bath of fused slag 14 through a nozzle provided at the bottom of the tundish 18. The molten metal 13 then passes through the bath of fused slag 14 and is mixed with the metal formed by fusion of the consumable bar electrodes 12, so that the metal pool 15 is formed. The metal pool 15 is cooled by the water cooled mold 17 and thus solidified to form deposited metal 16, with the result that electroslag surfacing is produced in accordance with the deposition of metal.

The rate of addition of molten metal 13 should be controlled so as to control the speed of the rise of the metal bath in such a manner that the rising speed per minute falls within the range of from 7 to 25% of the gap between the mold 17 and the roll workpiece 10. If the rising speed, i.e. the welding speed, is slower than 7 mm/minute in the case where the distance between the mold and the workpiece is 100mm, it is difficult to keep the fusion penetration shallower than 30 mm. On the other hand, if the welding speed is higher than 25 mm/minute, pinholes are liable to form at the center of the deposited metal layer and a deposited metal layer free from defects cannot be obtained. The range of the welding speed is determined depending on the gap between the mold and the workpiece for the following reasons. Namely, with a decrease in the gap width, the quantity and heat content of the slag are reduced, so that the fusion penetration is reduced. In addition, with a decrease in the gap width, the shape of the metal pool 15 tends to be convex and cavities or minute pinholes are liable to be formed in the deposited metal. Therefore, the metal addition rate must be reduced in correlation with the decrease in the gap width, so as to adapt the welding speed to the shallow fusion penetration and also to keep the metal pool shallow.

With the progress of welding, the mold 17 and the tundish 18 are simultaneously displaced upwards. During welding, the roll workpiece 10 and the deposited metal 16 integrally deposited on the roll workpiece 10 are rotated uni-directionally. The metal pool 15 and the bath of fused slag 14 are caused to rotate following the rotation of the roll workpiece 10 with the deposited metal 16. Preferable, the mold 17 is rotated synchronously with the workpiece, thereby avoiding friction between the mold 17 and deposited metal 16.

The consumable bar electrodes 12 must be lowered at a rate proportional to the consumption thereof. The welding current and voltage are controlled so that a predetermined range of fusion penetration, preferably 10 ± 5 mm, is obtained. The quantity of the components of the consumable bar electrodes 12 transferred to the deposited metal 16 is determined by the yield of the respective components. The composition of the consumable bar electrodes 12 is therefore modified from that of the deposited metal 16 taking the yield into consideration. If carbon, which is one of the components mentioned above, is present in the form of graphite, the graphite reacts with suboxides in the slag. Carbon must therefore be present in the electrodes in the form of chemically stable cementite. The welding operation is completed when a predetermined length of surfacing is obtained.

Figure 4:
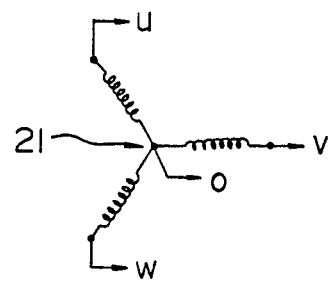
FIG. 4 is a schematic circuit diagram of the connection of electrodes employed in the present invention.
Figure 5:
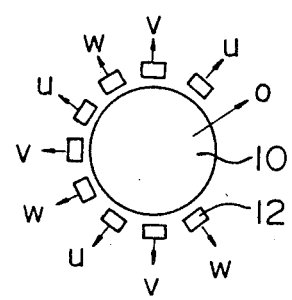
FIG. 5 is a schematic diagram of an electric power supply system employed in the present invention.

The power feed system used in the present invention is illustrated in FIGS. 4 and 5. Reference numeral 21 denotes secondary windings of a three-phase welding current-source transformer having a constant-voltage characteristic. References "u", "v" and "w" indicate the phases of the three-phase alternating current. The secondary windings 21 are connected in a star connection. Power is fed to nine electrodes altogether corresponding to the phases of current through the electrodes u, v, and w which are successively arranged in the circumferential direction around the roll workpiece 10. The roll workpiece 10 is connected to the neutral point of the star connection.

In an embodiment of the method for depositing on a workpiece a metal of a kind different from that of the workpiece, the molten metal 13, which has a composition corresponding to that of the surfacing metal, is continuously added to the surface of fused slag 14, and the metal additional ratio $\eta(\%)$ for defining the quantity of the molten metal to the total filler metal is:

$$\eta \geq 98 - 4.3\rho$$

wherein $\rho$ is the current density in the slag bath in amperes/cm$^2$.

Before the explanation of FIGS. 6 through 9 is given, the background of the metal addition ratio ($\eta$) will be explained.

First, the present inventors conducted experiments in which a metal pool with a high temperature and quantity was provided. In these experiments, in order to enhance the stirring or ability of the metal pool to have metal diffused therein, the metal pool was kept deep and the fusion penetration was kept shallow so that only a small quantity of the base metal was fused. Before starting the research, the welding current and the voltage, which are basic operation parameters (welding conditions) of electroslag welding, were investigated to see how they influence electroslag welding. As a result, it turned out that: the depth of the metal pool is increased considerably with an increase in the welding current; the depth of the fusion penetration is also increased with the increase in and welding current, and an appropriate fusion penetration in the range of from 10 to 20 mm cannot be obtained unless the voltage is at an extremely low level. A welding voltage decrease was found to be quite effective for decreasing the fusion penetration as compared with a welding current decrease. The depth of the metal pool was disadvantageously decreased by a welding current decrease but was not increased appreciably by a welding voltage decrease. Accordingly, it was discovered that a deep metal pool and a shallow fusion penetration cannot be obtained simultaneously by controlling the welding current and voltage, except for an extremely high welding current and an extremely low welding voltage. Namely, when the welding current has a current density of 23 amperes/cm$^2$ or higher in the slag pool and the welding voltage is 15 volts or lower, a metal pool 100 mm or thicker and approximately a 10 mm thick fusion penetration can be obtained and thus the structure of the deposited metal becomes free from non homogeneity. However, in order to perform the welding under such voltage and current conditions, the electric conductivity of the slag must be very high. Such slag, however, has a low operation efficiency due to low heat generation and is liable to cause such defects as entrapment of slag and pinholes.

An increase in the welding speed greatly contributes to the increase of metal pool depth in accordance with the welding current increase described above. The rate of consumption of the electrodes is increased with the welding current increase. Since the electrode is vertically displaced with respect to the deposited metal in electroslag welding, the electrode is deemed to be a vertically displacing heat source which establishes a temperature gradient in the metal pool. When the displacing speed is low, the temperature gradient is gradual and the metal pool becomes deep. The decrease in the displacing speed of the electrode can therefore increase the welding speed.

Second, the present inventors conducted experiments to enhance the welding speed so as to increase the metal pool depth and completed the experiments by using a filler material other than the consumable electrodes. In the embodiment of the present invention, since the addition of molten metal is controllable in addition to the control of the basic operation parameters, i.e., the welding current and speed, the conditions of welding can be very widely selected as compared with those based on control only of the basic operation parameters. In addition, deposits of various shapes can be obtained in the embodiment of the present invention.

Figure 6:
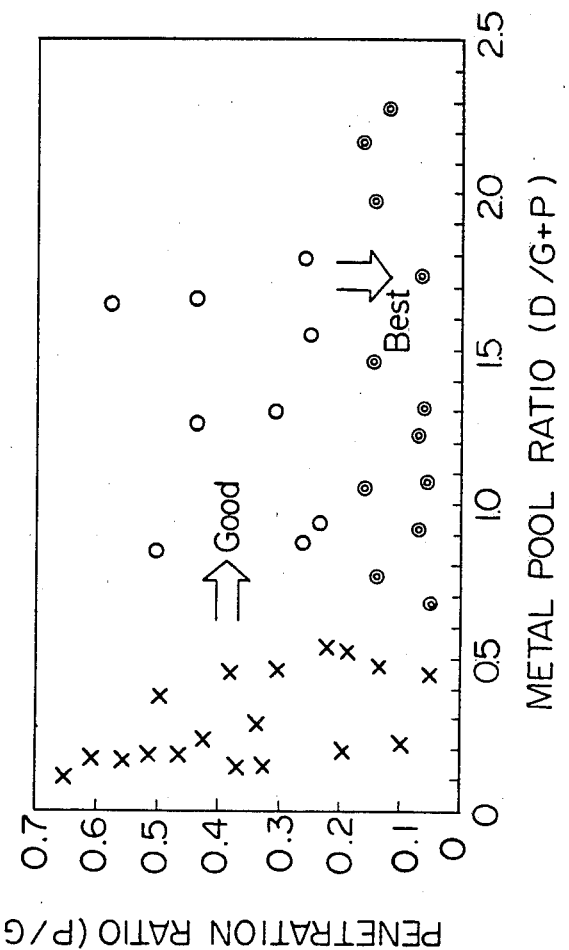
FIG. 6 is a graph illustrating the relationship between a penetration ratio and a metal pool ratio.

Referring to FIG. 6, the metal pool ratio defined by "metal pool depth (D)/fusion penetration depth (P)+ surfacing radius (G)" is indicated on the abscissa, while the penetration ratio defined by "fusion penetration depth (P)/fusion penetration depth (P) + surfacing radius (G)" is indicated on the ordinate. The shape of deposited metal and quality (occurrence of peterogeneous structure) were investigated in surfacing formed under various conditions and the results are shown in FIG. 6. In FIG. 6, the symbol x designates completely undesirable deposited metal due to heterogeneous structure-layers extending from the workpiece to the middle of the deposited metal. The symbol ◯ designates no occurrence or slight occurrence of the heterogeneous structure-layers. The length of these layers were so short, that they present no problem when using the surfaced articles. The symbol ⊙ designates complete absence of the heterogeneous structure.

As understood from FIG. 6, the regions of these three symbols are quite distinct from each other. At a metal pool ratio of 0.6 or more the heterogeneous structure is either not generated or its generation presents no practical problems. In addition, at a metal pool ratio of more than 0.6 and a penetration ratio of less than 0.2, heterogeneous structure is not generated at all. These facts prove the inventors' conception that both shallow fusion penetration and a deep metal pool are necessary for preventing the generation of a heterogeneous structure.

Figure 7:
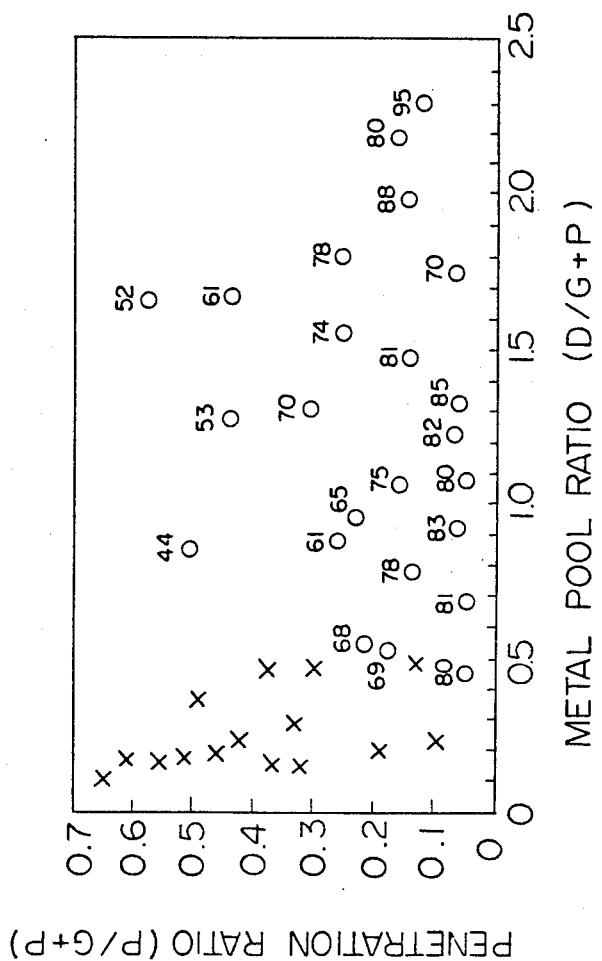
FIG. 7 is a graph illustrating the relationship between the penetration ratio and the metal pool ratio.

Welding conditions for obtaining a penetration ratio of more than 0.6 will now be explained. Referring to FIG. 7, the data of FIG. 6 are reproduced and the welding conditions for the filler metal, i.e. surfacing with or without the addition of molten metal and the quantity of the molten metal addition, are shown in FIG. 7. The symbol X in FIG. 7 indicates the conventional method without the addition of molten metal, and the symbol ◯ indicates the surfacing method with the addition of molten metal. Numerals indicates the metal addition ratio ($\eta$).

As is apparent from FIG. 7, most of the data exhibiting a metal pool ratio of less than 0.6 are those of the conventional method without the addition of molten metal, and several data with the addition of molten metal exhibited a metal pool ratio of less than 0.6. All data, which exhibited a metal pool ratio of 0.6 or more, were those carried out with the addition of molten metal. It seems from FIG. 7 that the data indicated at the extreme right and lower region of FIG. 7 tends to have a higher metal addition ratio ($\eta$).

Figure 8:
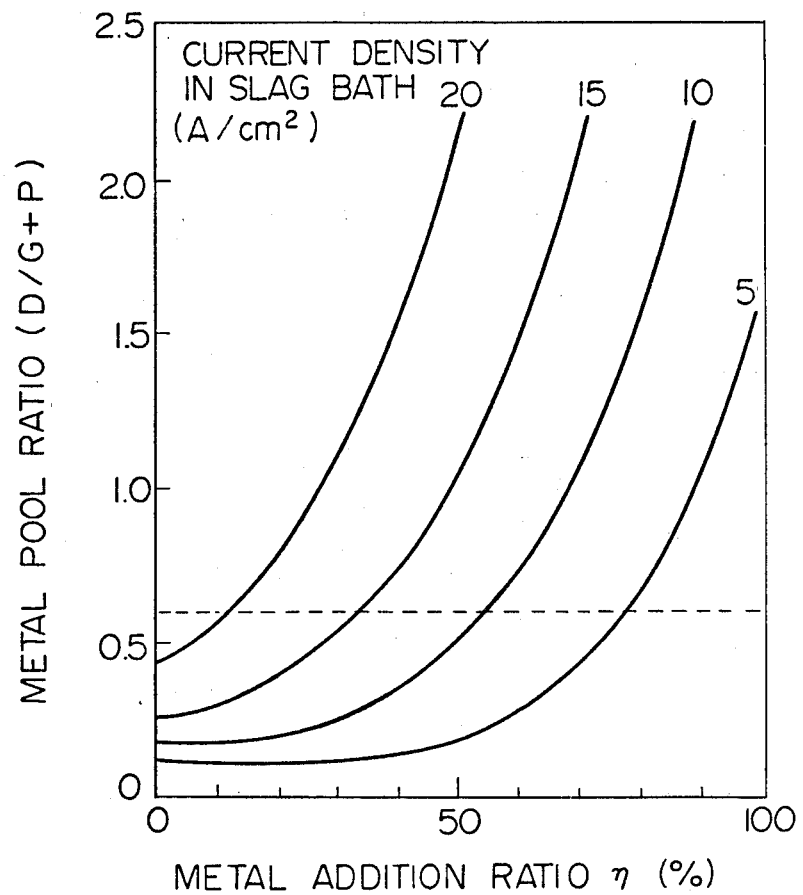
FIG. 8 is a graph illustrating the relationship between the metal addition ratio and the metal pool ratio.
Figure 9:
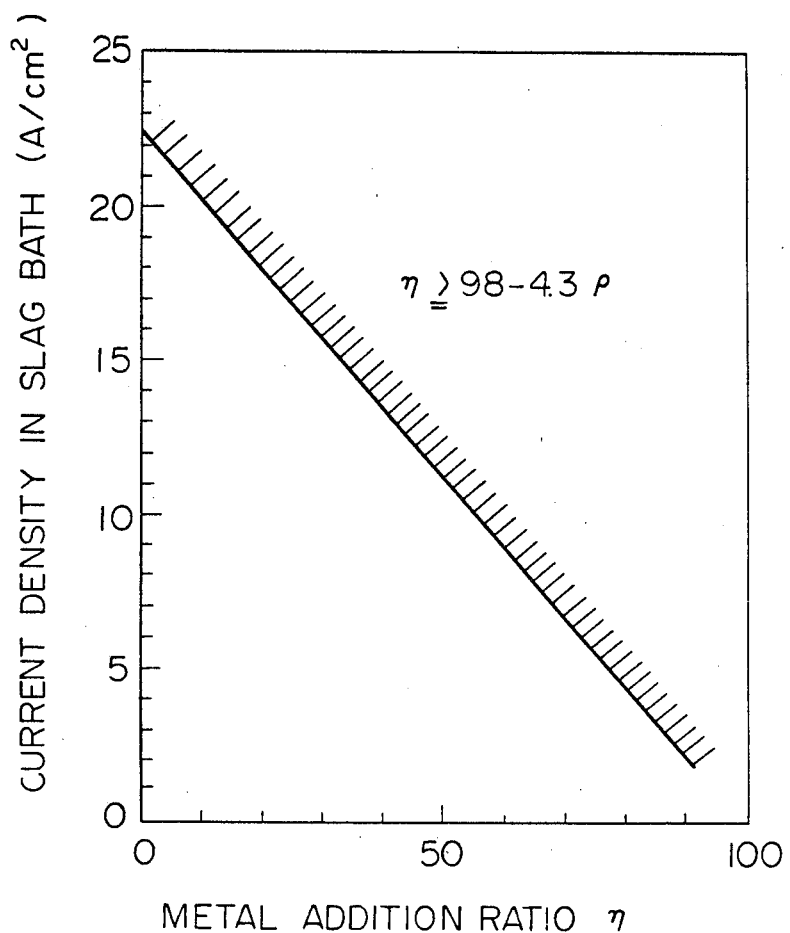
FIG. 9 is a graph of the current density in a slag bath in relation to the metal addition ratio.

The data of FIGS. 6 and 7 as well as the data of additional experiments were analyzed with regard to the welding conditions also including the welding current and voltage. The results are illustrated in FIG. 8. The data in FIG. 8 indicates that: the metal pool depth is determined by the ratio of the welding current to the metal addition ratio ($\eta$), and; the metal pool ratio is determined by the current density in the slag bath and the metal addition ratio ($\eta$). The current density in the slag bath is obtained by dividing the welding current by the surfacing gap area which is by the smallest cross sectional area of space formed between the surface of the workpiece and the surface of the mold. The results indicated that the influence of the welding voltage on the metal pool ratio and on the metal addition ratio ($\eta$) is negligible. As is apparent from FIG. 8, the metal pool ratio increases with an increase in the metal addition ratio ($\eta$) and the current density in the slag bath. In order that the metal pool ratio be not less than 0.6, the current density in the slag bath and the metal addition ratio ($\eta$) should be selected to that the curves of FIG. 8 are located on or above the dotted line. The thus selected current density and metal addition ratio ($\eta$) are illustrated in FIG. 9, namely, when $\eta(\%)$ is not less than $98-4.3\rho$ ($\eta \geq 98-4.3\rho$), the condition of a metal pool ratio of not less than 0.6, which makes it possible to carry out a composite surfacing without the generation of a heterogenous structure, is satisfied. The following point is important when considering FIG. 9. Namely, a small metal addition ratio ($\eta$) does not result in the generation of a heterogeneous structure, even if the current density in the slag is kept high. However, a special slag is necessary, as explained above, and the maximum current density used in the electroslay surfacing operation should be 20 amperes/cm$^2$. In the case where the current density in the slag is high, for example 20 amperes/cm$^2$ and the welding voltage is 20 volts or higher, the necessary welding conditions for obtaining a satisfactory quality are: use of the special slag, and; addition of molten metal, e.g. at least 10%. Preferable welding conditions from the stand point of operational efficiency and good quality are: a current density in the slag bath in the range of from 7 to 15 amperes/cm$^2$, and; a metal addition ratio of not less than 45%.

The position of the slag bath surface, into which the molten metal is added or caused to flow, is preferably almost the center, with respect to the radial direction of the surfacing space. The requisite metal pool ratio of 0.6 or more cannot be obtained, if such position is extremely close to the workpiece or the mold. The space between the adjacent electrodes may be about 100 mm in the circumferential direction which is enough for flowing the molten metal therethrough. The rotation speed of the workpiece in the method of the present invention is not dependent on the diameter of the workpiece. Preferably, the rotating speed should be such that the circumferential speed at the center of the surfacing gap is 1m/minute or higher.

The electroslag surfacing apparatus for carrying out the method according to the present invention is composed of means for carrying out simplified techniques of welding, ingot-making and casting, which can easily be performed and allows stable production of high quality products.

First, with regard to the power feed system, the power may be fed to the individual consumable bar electrodes 12 (FIGS. 2 and 3) by the power feed system connected to each of the electrodes, which presents technically no problems except for a large scale installation and complicated operation. Since a large scale installation and complicated operation are not preferable, power is fed in unison by the single power feed system to all the consumable bar electrodes 12 according to one of the features of the present invention.

Generally speaking, there are two types of power sources for feeding the power to the consumable electrodes for electroslag welding or remelting, i.e. power sources having constant voltage- and constant-external characteristics. When the power source has a constant voltage-external characteristic, the position of the tip of the consumable bar electrodes is kept constant in the bath of fused slag 14 and the operation can be stably carried out provided that the electrode feed rate is kept at a constant value which depends on the current value. The voltage is determined by the power source. When the power source has a constant current-external characteristic, stable operation can be achieved by controlling the electrode feed rate so as to maintain a constant voltage which is controlled via a feed back loop transmitting an operation voltage to the system for feeding the electrodes.

In order to achieve a stable operation, while using a multi-phase alternating current power source and feeding currents in unison to all the consumable bar electrodes, it is necessary to employ a power source having a constant voltage-characteristic and also to connect the neutral point "0" (FIG. 4) of the power source to the roll workpiece 10 (FIGS. 2 and 3). Reasons for this necessity when using the multi-phase alternating current power source are explained in comparison with the case of using a single-phase current source. If a multi-electrode welding is to be carried out using one single-phase current source as a power source, the electrodes must be connected in parallel. If the parallelly connected electrodes are fused at speeds different from one another, the immersion depth of the electrodes differs from one another. Then, the voltage of one or some of the electrodes deeply immersed into the fused slag is increased and a higher current is conducted through these electrodes than the other electrodes, with the result that the voltages in all the electrodes is eventually equalized. The immersion depth of the electrodes is, therefore, equalized during the operation at varying melting speeds, not withstanding that all the electrodes are fed in unison. In addition, the differences in the current and voltage are eliminated by the change in the immersion depth of the electrodes, which makes it possible to stably carry out the surfacing operation.

However, when a multi-phase alternating current power source is used, only the electrodes of each given phase are connected in parallel, and, the electrodes of one phase are not connected in parallel with the electrodes of the other phases. The equalizing phenomenon explained above occurs only in the electrodes of the individual phase but not between the electrodes in the different phases. The constant-voltage characteristic of the multi-phase alternating current power source is, therefore, necessary for achieving the equalizing phenomenon, namely, for conducting a high current through the electrodes having a low voltage and a low current through the electrodes having a high voltage, the characteristic of the power source must be utilized. The unbalanced current between phases (u, v, w, FIG. 4) is transmitted via the roll workpiece 10 (FIG. 5) to the neutral point 0 of the power source.

The number of the consumable electrodes may be the same as or a multiple of the number of phases of the current source. Preferably, the circumferential arrangement of the electrodes is coincident with the phase sequence of the multi-phase alternating current.

Second, the tundish used for the addition of molten metal will be described. The molten metal is continuously added by means of the tundish to the slag bath preferably at a constant rate. It is the method of using the tundish that can continuously and conveniently add molten metal to the slag bath at a constant rate.

The requisite addition rate of the molten metal can be provided by selecting the diameter of the nozzle on the bottom of the tundish. The addition rate of the molten metal should be in the range of from 5 to 30 kg/minute and is considerably lower than that achieved by conventional methods, such as an overflow method using a tiltable ladle or a method using an electromagnetic pump. If these conventional methods are used for controlling the addition rate in the range of from 5 to 30 kg/minute, the molten metal solidifies at the spout of the ladle or the like, or even if solidification does not occur, the addition rate varies greatly during the molten metal addition. In addition, installations including a tiltable ladle or an electromagnetic pump are large and their operation is complicated.

The nozzle diameter for obtaining the above addition rate of molten metal should be from 3 to 6 mm, and the depth of melt in the tundish from 200 to 500 mm. An almost constant addition rate, e.g. 15 kg/minute, through a nozzle having a diameter of 5 mm, can be ensured by controlling the temperature of the melt. When the level of melt in the tundish is lowered during the surfacing operation, a continuous addition of molten metal at a constant rate to the slag bath can be easily attained by supplementing melt in the tundish.

Third, a slip ring is necessary for electrically connecting the neutral point of the multi-phase alternating current power source to the workpiece which is rotated, preferably synchronously, with the mold. The connection between the neutral point of the power source and the workpiece is necessary for feeding or displacing in unison all the electrodes. In addition, this connection is crucial for the feed back of unbalanced currents from the respective phases including the unbalanced current of the electrodes of a given phase via the connection to the power source. Since the unbalanced current is usually a few percent of the total current (200–400 amperes for a total current of 20,000 ampere), the installation of the slip ring in the electroslag surfacing apparatus of the present invention is easy. The connection may be simply constructed with its rotary and stationary parts being equipped with a slip ring(s) made of copper and a few sliding contacts made of carbon, respectively.

Fourth, a movable mokle is necessary for carrying out the electroslag surfacing method according to the present invention. The level of the slag bath m ust always be maintained near the top end of the mold. Therefore, a mechanism for either lifting the mold or lowering the workpiece in accordance with the progress of welding is necessary for maintaining the slag level. During the lifting of the mold or the lowering of the workpiece, the distance between the tundish and the level of the slag bath should be constantly maintained so as to prevent any change in the position of addition of the molten metal. The tundish should therefore be moved or stopped synchronously with the mold so as to remain constant distance from the mold.

The embodiments of the apparatus for carrying out the method according to the present invention are illustrated in FIGS. 10 through 14 and are described hereinafter.

Figure 10:
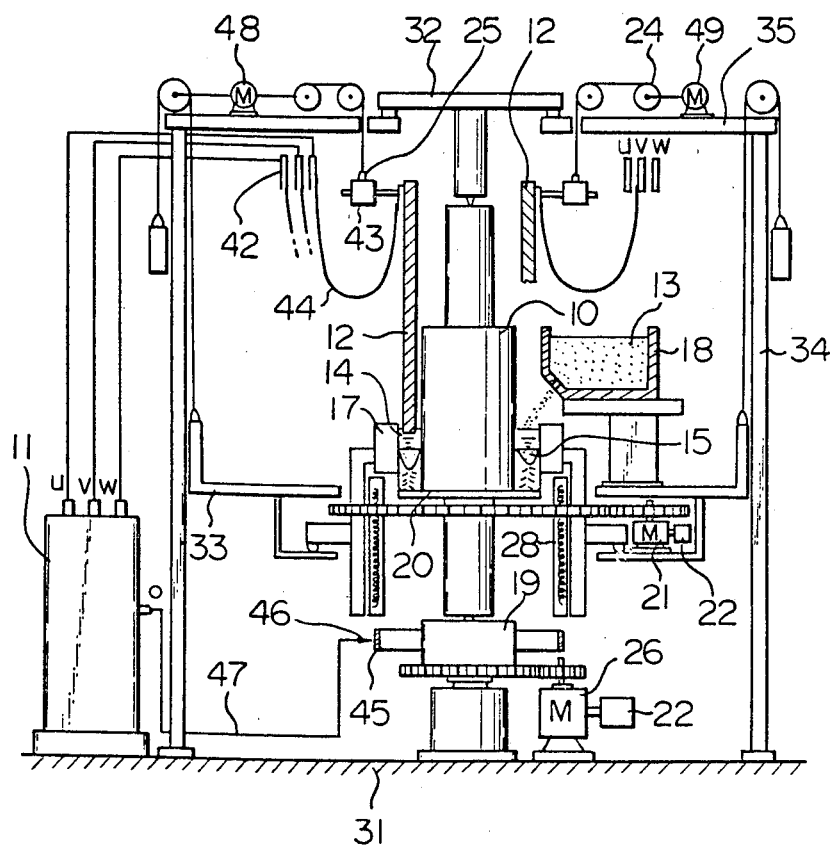
FIG. 10 is a front and partially cross sectional view of one embodiment of an electroslag surfacing apparatus for carrying out the method of the present invention.

Referring to FIG. 10, four supporting columns 34 rest on the stationary floor 31 and support on their top ends the platform 35. A turntable 19 is installed on the stationary floor 31 and an upper clamping means 32 is operably connected to the platform 35. The roll workpiece 10 is vertically held and clamped between the upper clamping means 32 and the turntable (lower clamping means) 19.

A vertically movable floor 33 capable of lifting the driving means described hereinafter is guided along the supporting columns 34 and is provided with an aperture for accommodating the mold 17. The driving means is constituted by a motor 48 which is mounted on the platform 35. By the operation of the motor 18, the mold 17, which surrounds the roll workpiece 10 and the tundish 18 are lifted or lowered in unison.

The consumable bar electrode 12 are fixed to a single electrode-holding arm 43 (FIG. 11) which is vertically movable and suspended via four wires 25 from the platform 35. The electrode-holding arm 43 is lifted or lowered by means of the wires and a drive means which is motor 49 mounted on the platform 35.

A multi-phase alternating current power source 11, hereinafter referred to as the power source 11, is installed on the stationary floor 31 and is connected in a star connection. Each phase u, v and w of the three-phase alternating current is fed through ring-form bus bars 42 and the flexible cables 44 to each electrode. The platform 35 is insulated from the power feed lines, and conduction between the consumable bar electrodes 12 through the electrode-holding arm 43 does not occur. The neutral point "0" of the power source 11 is connected to the roll workpiece 10 via a cable 47 and a slip ring 45 made of steel and secured around the turntable 19. Power is transmitted from the roll workpiece 10 to the neutral point "0" via a sliding contact 46 made of carbon.

The tundish 18 is disposed on the right and above the mold 17 in FIG. 10, so that the molten metal 13 is caused to flow from the nozzle to the center of the fused slat 14. The tundish 18 is horizontally movable by means of a mechanism not shown in FIG. 10. When the quantity of the molten metal 13 contained in the tundish 18 becomes small, the tundish 18 is displaced horizontally in a radial direction with respect to the axis of the roll workpiece 10, so that the position at which the stream of metal flowing out of the tundish falls on the slag bath can be kept the same by the small horizontal displacement of the tundish.

A synchronous rotating means for rotating the roll workpiece 10 and the mold 17, hereinafter referred to as the synchronous rotating means, comprises separate driving motors 21 and 26 which are synchronously rotated at a coincident rotating speed by selsyns 22.

Figure 11:
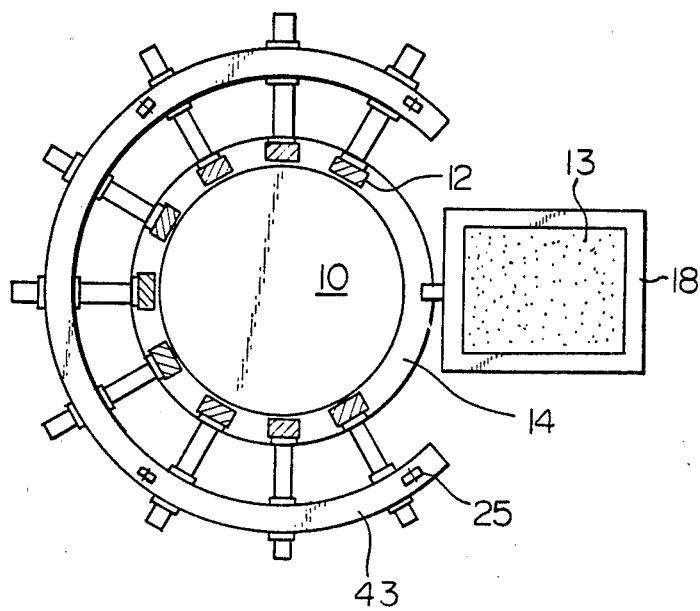
FIG. 11 is a plan view of the essential parts of the apparatus shown in FIG. 10.

Referring to FIG. 11, the electrode-holding means 43 is in the form of three fourths of a circle with a arcuate open part corresponding to a quarter of the circle. The tundish 18 is positioned in the open part and therefore, does not interfere with the electrode-holding means 43. In addition, the molten metal can be easily charged from a ladle (not shown) into the tundish 18, if a ladle is to be used.

Figure 13:
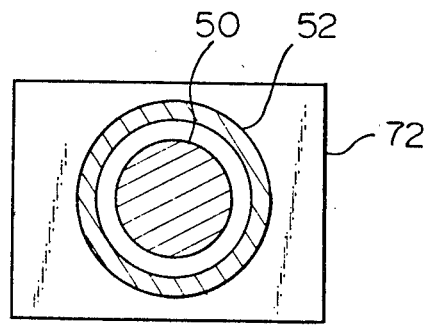
FIG. 13 is a cross sectional view along the line A—A of FIG. 12.
Figure 12:
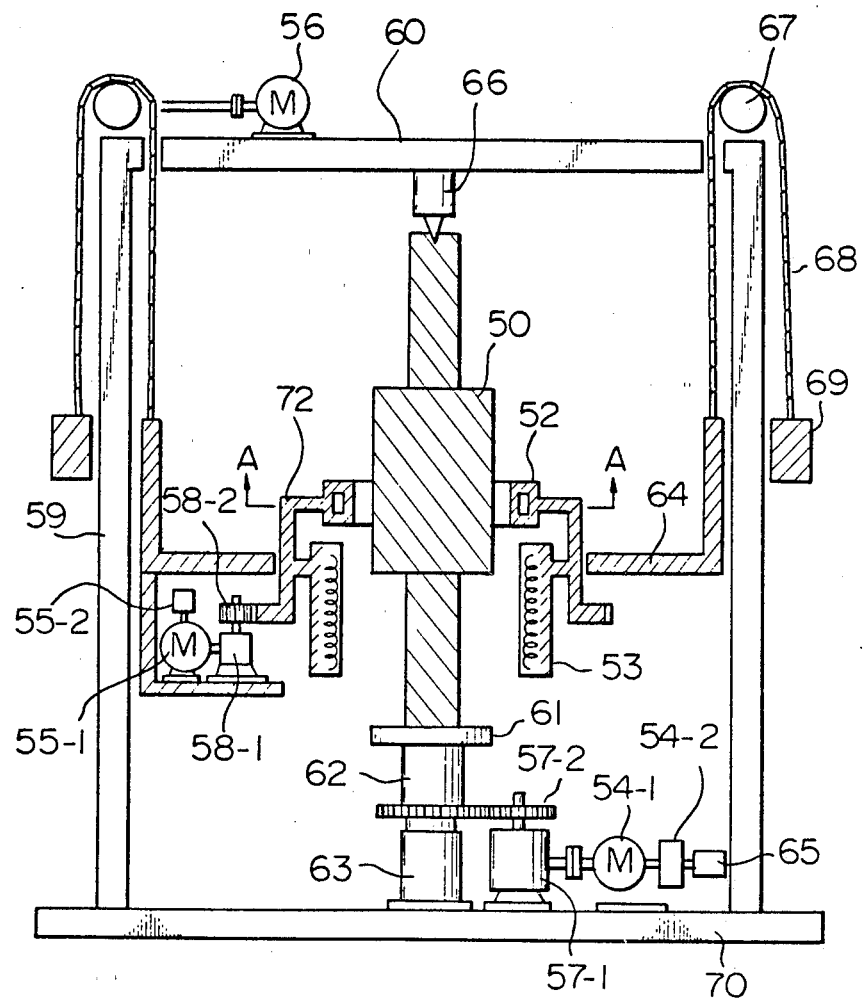
FIG. 12 is a partially cross sectional front view of an embodiment of an electroslag surfacing plant for carrying out the method according to the present invention.

Another embodiment of the apparatus is shown in FIGS. 12 and 13, and this apparatus comprises:

a stationary floor;

a turntable installed on the stationary floor and supporting a workpiece vertically mounted thereon;

a multi-phase alternating current power source having a star connection output and a constant voltage characteristic, the workpiece being electrically connected to the neutral point of the star connection;

a slip ring for connecting the workpiece to the neutral point of the star connection;

a mold for defining a surfacing space, disposed in proximity to the workpiece upwardly movably with the progress of the surfacing operation;

a plurality of consumable electrodes in the form of a large cross section bar;

an electrode-displacing means for lifting and lowering all the consumable electrodes in unison;

a tundish for adding a molten metal, disposed above the surfacing space and being upwardly movable with the progress of the surfacing operation;

a means for holding the heat of the workpiece;

a vertically movable floor,on which the mold, the tundish and the heating means are mounted, and;

a synchronous rotating means for rotating the workpiece, the mold and the heating means around the axis of the workpiece during an upward movement of the tundish and the mold, said synchronous rotating means being installed on said vertically movable foor and electrically synchronizing the rotating speeds of the workpiece, mold and the heating means.

Referring to FIG. 12, the cylindrical workpiece 50 is held in a vertical position by means of an upper clamping means 66 and a turntable (lower clamping means) 61. The turntable 61 is rotatably installed on the stationary floor 70 and causes the rotation of the cylindrical wokrpiece 50. The platform 60, to which the upper clamping means 66 is secured, is supported by four supporting columns 59. The driving force of a drive motor 54-1 is transmitted to the turntable 61 via a worm-type reduction gear 57-1 and a transmission gear 57-2. The drive motor 54-1 is fitted with a tachometer 54-2 and a synchronous rotating device 65.

The mold 52, which surrounds the cylindrical workpiece 50 and the heater 53 for holding heat in the deposited metal, are conveniently made of a monolithic body including a connecting table 72. The mold 52 and the heater 53 are suspended from the vertically movable floor 64 which is composed of a worker's floor and a floor for mounting the drive motor 55-1. In addition, the mold 52 and the heater 53 are provided coaxially with respect to the cylindrical workpiece 50. The vertically movable floor 64 is capable of being lifted and lowered following the movement of a balance weight 69 which is connected to the vertically movable floor 64 via chains 68 wound around the sprockets 67, the sprockets being driven by motor 56.

The driving force of the drive motor 55-1 is transmitted to the mold 52 and the heater 53 via the worm-type reduction gear 58-1 and the transmission gear 58-2, thereby causing the rotation of the mold 52 and heater 53. The rotation of the drive motor 55-1 monitored by the tachometer 55-2 is electrically interlocked with the rotation of the drive motor 54-1 and both rotations are synchronously controlled with the aid of the synchronous rotating device 65.

One of the features of the apparatus illustrated in FIG. 12 and described hereinabove is the provision of means for imparting an external driving force to both the workpiece and the mold, and; synchronously rotating the workpiece with the mold. Another feature directed to a cooling-water supply system is described hereinafter.

The mold 52, to which cooling water is to be supplied, is not divided according to the present invention. Conventionally, such a mold has been partitioned into upper and lower sections, one of which is movable, and packing has been used to seal the space between these two sections. Since the packing has been located in the proximity of a welding heat source, the seal becomes ineffective, because of thermal deformation or the like, for preventing water leakage. In addition, the mold has become large scale and it has become expensive to provide the conventional supply system for water for cooling.

In the apparatus illustrated in FIG. 12, a rotary joint 62 and a stationary joint 63 are located below the cylindrical workpiece 50 which is held in a vertical position. Since these joints 62 and 63 including water-conduits (not shown) are placed at a distance from the welding heat source, they are not subjected to serious effects of heat, and the entire apparatus becomes very compact.

The synchronous rotation of the mold 52 with the cylindrical workpiece 50 can be achieved by a single motor but is preferably done by separate motors (55-1 and 54-1) for synchronously driving the mold 52 and the cylindrical workpiece 50, respectively. When a single motor is used, it is necessary to mechanically synchronize the rotation of the mold 52 and the cylindrical workpiece. However, this is difficult when surfacing a long workpiece, because, due to the necessity of heating the faced part of the workpiece during the surfacing operation, the mold is moved upward during the surfacing operation. For electrically synchronizing the rotation, either a phase angle control of three phases of the power supply by means of a selsyn control system or control of the rotation speed by means of a pulse generator can be employed. The synchronous rotation must be such that the difference in the rotation speed between the workpiece and the mold is 0.1% or lower, which can be achieved preferably by electrical synchronizing.

In FIGS. 12 and 13, neither the tundish, multi-phase alternating current power source, nor the slip ring are shown for the sake of brevity but three are indispensable members of the surfacing apparatus. Their functions and relationship with other members of the apparatus shown in FIGS. 12 and 13 will be understood from the descriptions of the corresponding parts in FIGS. 10 through 13.

Figure 14:
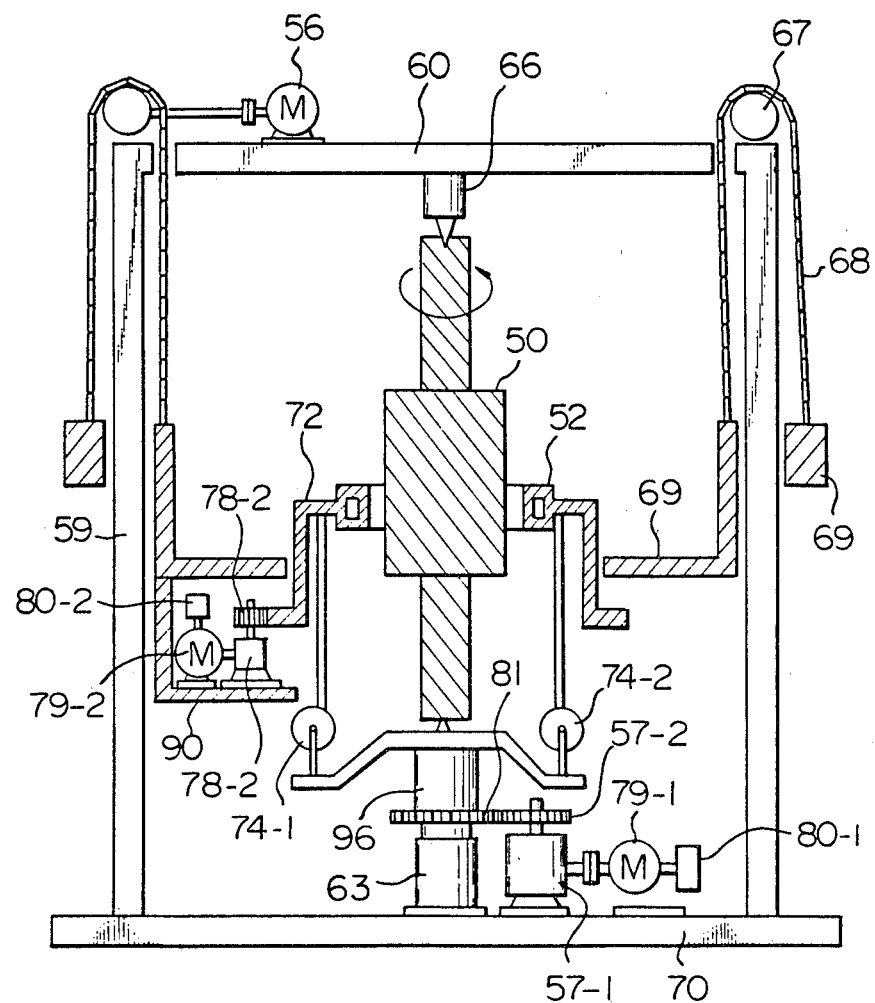
FIG. 14 is a view similar to FIG. 12 and illustrates another embodiment of the plant.

An embodiment of the apparatus described in reference to FIGS. 14 and 15 comprises:

a stationary floor;

a rotary joint rotatably mounted on the fixed floor and having apertures for admitting and withdrawing the cooling water;

a multi-phase alternating current power source having a star connection output and a constant voltage characteristic, a cylindrical workpiece being electrically connected to the neutral point of the star connection;

a slip ring for connecting the workpiece to the neutral point of the star connection;

a mold for defining a surfacing space, disposed in proximity to the workpiece and being upwardly movable with the progress of the surfacing operation;

a plurality of consumable electrodes each in the form of a large cross section bar;

an electrode-displacing means for lifting and lowering all the consumable electrodes in unison;

a tundish for adding a molten metal, disposed above the surfacing space and being upwardly movable with the progress of the surfacing operation;

hoses which are extendable when the mold moves upwards, and which communicate the mold with said apertures of the rotary joint and;

a synchronous rotating means for rotating the workpiece and the mold around the axis of the workpiece during upward movement of the tundish and the mold.

Referring to FIGS. 14 and 15, the cylindrical workpiece 50 is rotatably and vertically held between the upper clamping means 66 and the lower clamping means 96. The upper and lower clamping means are rigidly fixed in position by a framework constituted by the platform 60, the stationary floor 70, and four supporting columns 59. The mold 52 (FIG. 15), which surrounds the cylindrical workpiece 50 is water-cooled and provided with a feed joint 83 and a drain joint 84. The feed joint 83 and the drain joint 84 as well as a water jacket 86, which communicates with these joints 83 and 84, are mounted on a supporting platform 87. The supporting platform 87 includes a protruding part 87-1 circumferentially attached thereto which has the horizontal under surface resting on the horizontal rollers 88. The supporting platform 87 is guided during the rotation by vertical rollers 89 which limit and restrict the horizontal displacement of the vertical edge of the protruding part 87-1. The position of the vertical roller 89 can be adjusted by a screw 121. The driving mechanism of the synchronous rotating means collectively denoted by the numeral 100 comprises a drive motor 79-2, a worm-type reduction gear 78-2, a transmission gear 85 and a selsyn 80-2 which are operatively connected with one another so as to rotate the mold 52.

The worker's floor 69 may or may not be provided in the proximity of the floor 90 on which the members 79-2, 78-2, 85 and 80-2 described above are installed. The floor 90 can be lifted by means of the motor 56 in FIG. 14 which transmits the driving force to the floor 90 via the sprocket 67 and the chain 68 having the balance weight 69.

The lower clamping means 96 (FIG. 14) is coaxial with the rotation axis of the cylindrical workpiece 50 and is installed on the fixed floor 70 via the rotary joint 63 which is coaxial with the lower clamping means 96. Reels 104 for the hoses 105 are preferably provided in the surfacing apparatus as illustrated in FIG. 15 in such a manner that the reels 104 are synchronously rotated with the workpiece. The reels 104 are secured to the lower clamping means via a supporting plate 106. The hoses 105 communicate the mold 52 with the cooling water-inlet 108 and outlet 109 of the rotary joint 63 via (a) rotary joints 107-1 and 107-2 formed at the end of the columns 105 for supporting the reels 104-1 and 104-2, (b) the jacket 86 and (c) the feed and drain joints 83 and 84, respectively. The hoses 105 are pulled out or wound around the reels 104-1 and 104-2 in accordance with the vertical movement of the mold 52, preferably by means of springs (not shown) furnished in the reels 104-1 and 104-2.

The rotary joint 63 consists of an outer case 63-2 and an inner rotary body 63-1 the outer case being provided with a water-inlet 108 and a water-outlet 109. A mechanical seal (not shown) is provided so as to prevent water leakage from occurring during the rotation of the rotary joint 63. The inner rotary body 63-1 is secured to the lower clamping means 96 and is rotatable by means of the driving mechanism 100. The outer case 63-1 is fixed on the stationary floor 70. The lower clamping means 96 is rotatably supported on the pedestal 111 via thrust bearings 112, and a radial bearing 113 located on the outer case 63-2 is engaged with the inner rotary body 63-1, with the result that the cylindrical workpiece 50 can be smoothly rotated.

The driving mechanism of the synchronous rotating means collectively denoted by the reference numeral 120 comprises a transmission gear 57-2, a worm-type reduction gear 57-1, a drive motor 79-1 and a selsyn 80-1.

The surfacing apparatus illustrated in FIGS. 14 and 15 is operated as follows.

The cylindrical workpiece 50 is caused to rotate by the driving mechanism 120 which simultaneously causes the rotation of the reels 104-1, 104-2 secured on the supporting plate 106. While the cylindrical workpiece 50 is rotated, the mold 52 is rotated by the driving mechanism 100 at a speed electrically synchronized with the rotation speed of the cylindrical workpiece 50. The mold 52 is moved not only circumferentially but also upwards, while the cooling water is supplied via the hoses to the mold 62 during the surfacing operation.

Examples of the electroslag surfacing method of the present invention are set forth hereinafter.

EXAMPLE 1

The electroslag surfacing was carried out under the following conditions.
A. Roll workpiece
   The diameter of the roll workpiece body to be faced was 700 mm and its length was 1800 mm. The roll workpiece was made of JIS S 45C (carbon steel).
B. Mold
   The inner diameter of the mold was 900 mm, and, therefore the surfacing radius was 100 mm.
C. Electrodes
   The dimension of each of the nine electrodes was 50 mm × 100 mm × 2500 mm long. The composition of the electrode castings was 1.7% C, 0.3% Si, 0.7% Mn, 2.0% Cr, 2.5% Ni and 0.7% Mo, the rest being essentially Fe.
D. Molten Metal
   Molten metal having a temperature of 1500° C. was added at a rate of 15 kg/minute. The composition of the molten metal was 1.7% C, 0.3% Si, 0.7% Mn, 1.9% Cr, 2.4% Ni and 0.8% Mo, the rest being essentially Fe.
E. Current
   A current of 200~2200 amperes × 9 electrodes, i.e. 18000~19800 amperes, was transmitted through the electrodes.
F. Voltage
   30~35 volt
(The current and voltage were adjusted to within the above respective ranges)
G. Rotation speed of the roll workpiece
   1 rpm The results of surfacing for producing a composite roll under the above conditions were as follows.
H. Welding speed
   15 mm/minute
I. Metal addition ratio η (the proportion of the added molten metal to the total filler material)
   80%
J. Welding time
   130 minutes
K. Fusion penetration of the roll workpiece
   Approximately 10 mm
L. Surface quality of deposited metal
   Smooth without unevenness The obtained composite roll was cut to investigate the structure thereof, which revealed complete metal deposition, no segregation in the deposited metal and no defects. Accordingly, a composite roll with excellent quality was produced within a short welding time period.

EXAMPLE 2 (Comparative Example)

The electroslag surfacing was carried out under the following conditions.
A. Roll workpiece
   The diameter and length of the roll workpiece body to be faced were 280 mm and 1500 mm, respectively. The length of the entire roll workpiece was 2600 mm. The composition of the roll workpiece was 0.4% C, 1% Ni and 0.5% Mo, the rest being essentially Fe.
B. Mold
   The inner diameter of the mold was 440 mm, and, therefore, the surfacing radius was 80 mm.
C. Electrodes
   Fifteen flux-cored electrodes having a diameter of 3.2 mm and composition of 1.2% C, 1% Ni, 1% Cr and the rest being Fe were used.
D. Molten Metal
   Molten metal having the same composition as the electrodes was added onto the slag layer at one location of the slag layer. The addition rate was 9 kg/minute
E. Flux (slag)
   Major components were $CaF_2$-$CaO$-$SiO_2$-$TiO_2$
F. Current
   400 amperes × 15 electrodes
G. Voltage
   40 volts at each electrode
H. Rotation speed of the roll workpiece
   2 rpm The results of surfacing for producing a composite component under the above conditions were as follows.
I. Current density in slag bath
   6.6 amperes/cm$^2$ J. Welding speed
   17 mm/minute
K. Metal addition ratio η
   75%
L. Welding time
   130 minutes
M. Fusion penetration of the roll workpiece
   Approximately 35 mm which corresponded to a penetration ratio of 0.30.
N. Depth of metal pool
   81 mm which corresponded to a metal pool ratio of 0.7

The obtained composite roll was cut to investigate the structure thereof, which showed no generation of a heterogeneous structure in the surfacing operation.

EXAMPLE 3

The electroslag surfacing was carried out under the following conditions.
A. Roll workpiece
   The diameter and length of the roll workpiece body to be faced were 685 mm and 2200 mm, respectively. The length of the entire roll workpiece was 4500 mm. The compositions of the roll workpiece was 0.8% C, 1% Cr and 0.3% Mo, the rest being essentially Fe.
B. Mold
   The inner diameter of the mold was 872 mm, and, therefore the surfacing radius was 92 mm.
C. Electrodes
   The cross sectional dimension of each of the six electrodes was 50 mm × 80 mm. The composition of the electrodes was 1.6% C, 2% Cr, 3% Ni and 1% Mo, the rest being essentially Fe.
D. Molten Metal
   Molten metal having the same composition as that of the six electrodes was added at a rate of 20 kg/minute onto one location of the slag layer.
E. Flux (Slag)
   Major components were $CaF_2$-$CaO$-$SiO_2$-$TiO_2$.
F. Current
   2600 amperes × 6 electrodes
G. Voltage
   30 volts
H. Rotation speed of the roll workpiece
   1 rpm The results of surfacing for producing a composite roll under the above conditions were as follows.
I. Current density in slag bath
   7.0 amperes/cm$^2$
J. Welding speed
   13 mm/minute
K. Metal addition ratio
   84%
L. Welding time
   170 minutes
M. Fusion penetration of the roll workpiece
Approximately 10 mm which corresponded to a penetration ratio of 0.16.
N. Depth of metal pool
   81 mm which corresponded to a metal pool ratio of 1.1.

The obtained composite roll was cut to investigate the structure thereof, which showed no generation of a heterogeneous structure in the surfacing operation.

The features of the present invention described above make the present invention industrially applicable, for example, in the following cases.

A. Although electroslag surfacing techniques for cylindrical components have been disclosed in a number of patent and other documents, these techniques involved difficulties in the industrial production of cylindrical components, mainly because the quality achieved by the conventional techniques is usually insufficient for very severe and restricted operating conditions of these components. The difficulty with the quality can be eliminated by making the electroslag surfacing apparatus complicated, large in scale and expensive but such apparatus cannot be used economically. The present invention eliminates the difficulties mentioned above and provides an electroslag surfacing method and apparatus industrially usable particularly for producing and reforming the rolling-mill rolls of metal industries.

B. Composite cylindrical components having excellent quality can be produced by the surfacing method and apparatus of the present invention.

C. One of the features of the present invention, a shallow fusion penetration which is adjustable to a minimum degree, can be advantageously utilized for reforming and repairing of a composite cylindrical component. In the present invention, the fusion penetration of the workpiece can be adjusted to a level less than the thickness of the facing layer which has been deposited on the workpiece, and the same facing metal as said layer is deposited on the workpiece while adjusting the fusion penetration as above.

We claim:
1. A method of surfacing a metal component having a cylindrical surface by an electroslag surfacing method, comprising:
   placing the component in a vertical position;
   placing a mold member around the lower end of the component with the inner surface of the mold spaced a distance from the cylindrical surface of the component to define a gap equal to the thickness of the surfacing;
   forming a molten metal pool having a metal composition of the metal to be applied to the component between the mold member and the cylindrical surface with a slag layer over the upper surface of the pool;
   inserting a plurality of consumable electrodes each having a composition corresponding to the metal to be applied to the component and each of which is in the form of a bar having a large cross-section into the molten metal pool and spaced between the mold member and the cylindrical surface and at intervals in the circumferential direction of the mold;
   supplying a multi-phase alternating current power to said electrodes and said component;
   while thus supplying power, raising the mold, the molten metal pool and the electrodes vertically and parallel to the cylindrical surface and at the time rotating the component around the vertical cylindrical axis thereof; and
   continuously adding molten metal having a composition corresponding to the metal to be applied to the component to the surface of the slag layer on the molten metal pool.
2. The method as claimed in claim 1 in which a metal of a kind different from the metal of the component to be applied to the component, and in which the step of adding molten metal comprises continuously adding molten metal having a composition corresponding to the metal to be applied to the component to the surface of the slag layer in a metal addition ratio $\eta(\%)$ which is the ratio of the quantity of the molten metal added to the total amount of metal to be applied and which ratio is:

$$\eta \geqq 98 - 4.3\rho$$

wherein $\rho$ is the current density of the current supplied to the molten metal pool in amperes/cm$^2$.

3. The method as claimed in claim 1 or 2 wherein the radial distance of the consumable electrodes from the cylindrical surface of the component is less than 30 mm.

4. The method as claimed in claim 3 in which the circumferential dimensions of the plurality of electrodes together equal at least ten percent of the circumferential dimension of the mold.

5. The method as claimed in claim 1 or 2 in which the rate of addition of said molten metal is controlled relative to the speed of the rise of the metal pool for keeping the pool rising speed within the range of from 7 to 25% of the size of the gap between said mold and said component.

6. The method as claimed in claim 1 or 2 further comprising rotating said mold synchronously with the rotation of the workpiece.

7. The method as claimed in claim 1 or 2 in which the electrodes have a substantially rectangular cross-section.

8. The method as claimed in claim 7 in which the long sides of the cross-section of the electrodes are curved with a radius intermediate the radius of the inner and outer edges of the gap.

9. The method as claimed in claim 1 or 2 in which the electrodes have a round cross-section.

10. The method as claimed in claim 1 or 2 in which the electrodes consist of an alloy of iron or steel with a carbon content of not less than 1%.

11. The method as claimed in claim 1 or 2 in which the rate of adding the molten metal is in the range of from 5 to 30 kg/min.

* * * * *